US007403894B2

(12) United States Patent
Rui et al.

(10) Patent No.: US 7,403,894 B2
(45) Date of Patent: Jul. 22, 2008

(54) ANNOTATING PROGRAMS FOR AUTOMATIC SUMMARY GENERATIONS

(75) Inventors: Yong Rui, Redmond, WA (US); Anoop Gupta, Woodinville, WA (US); Alejandro Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 732 days.

(21) Appl. No.: 11/081,118

(22) Filed: Mar. 15, 2005

(65) Prior Publication Data

US 2005/0160457 A1    Jul. 21, 2005

Related U.S. Application Data

(62) Division of application No. 09/660,529, filed on Sep. 13, 2000, now Pat. No. 7,028,325.

(60) Provisional application No. 60/153,730, filed on Sep. 13, 1999.

(51) Int. Cl.
*G10L 21/00* (2006.01)
(52) U.S. Cl. ...................... 704/223; 704/264
(58) Field of Classification Search .................. 704/223, 704/264
See application file for complete search history.

(56) References Cited

U.S. PATENT DOCUMENTS

| | | | |
|---|---|---|---|
| 5,828,809 A | 10/1998 | Chang et al. | |
| 5,918,223 A * | 6/1999 | Blum et al. | 707/1 |
| 5,973,250 A * | 10/1999 | Zirille et al. | 84/600 |
| 6,049,333 A | 4/2000 | Lajoie et al. | |
| 6,070,158 A | 5/2000 | Kirsch et al. | |
| 6,154,771 A | 11/2000 | Rangan et al. | |
| 6,289,167 B1 | 9/2001 | Boetje et al. | |
| 6,370,504 B1 | 4/2002 | Zick et al. | |
| 6,441,846 B1 | 8/2002 | Carlbom et al. | |
| 6,469,749 B1 * | 10/2002 | Dimitrova et al. | 348/722 |
| 6,546,135 B1 | 4/2003 | Lin et al. | |
| 6,631,522 B1 | 10/2003 | Erdelyi | |
| 6,751,354 B2 | 6/2004 | Foote et al. | |
| 6,996,572 B1 * | 2/2006 | Chakrabarti et al. | 707/102 |

OTHER PUBLICATIONS

Burges, C., "A Tutorial on Support Vector Machines for Pattern Recognition," Data Mining and Knowledge Discovery, 1998.
Faloutsos, C. et al., "Efficient and Effective Querying By Image Content", IBM Research Report, Aug., 1993, 27 pages.

(Continued)

*Primary Examiner*—David R. Hudspeth
*Assistant Examiner*—Jakieda R Jackson
(74) *Attorney, Agent, or Firm*—Perkins Coie LLP

(57) ABSTRACT

Audio/video programming content is made available to a receiver from a content provider, and meta data is made available to the receiver from a meta data provider. The meta data corresponds to the programming content, and identifies, for each of multiple portions of the programming content, an indicator of a likelihood that the portion is an exciting portion of the content. In one implementation, the meta data includes probabilities that segments of a baseball program are exciting, and is generated by analyzing the audio data of the baseball program for both excited speech and baseball hits. The meta data can then be used to generate a summary for the baseball program.

20 Claims, 7 Drawing Sheets

OTHER PUBLICATIONS

Gong, Y. et al., "Automatic Parsing of TV Soccer Programs", IEEE International Conference on Multimedia Computing and Systems, May 1995, pp. 167-174.

Ishikawa, Y. et al., "MindReader. Query databases through multiple examples", in Proc. of the 24th VLDB Conference, 1998.

Mackay, W. E. et al., "DIVA: Exploratory data analysis with multimedia streams", in Proceedings of CHI'98 (Los Angeles, CA, 1998), ACM Press, 416-423.

Platt, J.C. "Probabilistic Outputs for Support Vector Machines and Comparisons to Regularized Likelihood Methods", in Advances in Large Margin Classifiers, A. Smola, P. Bartlett, B. SchNlkopf, D. Schuurmans, eds., 1999, 11 pages.

Rui, Y. et al., "Digital Image/Video Library and MPEG-7: Standardization and Research Issues", IEEE ICASSP'98, pp. 3785-3788, May 12-15, 1998.

Rui, Y. et al., "Image Retrieval: Current Techniques, Promising Directions and Open Issues", Journal of Visual Communication and Image Representation, vol. 10, 39-62, Mar. 1999.

Rui, Y. et al., "Relevance Feedback Techniques in Interactive Content-Based Image Retrieval", Proc. of IS&T and SPIE Storage and Retrieval of Image and Video Databases VI, pp. 25-36, Jan. 24-30, 1998.

* cited by examiner

ANNOTATING PROGRAMS FOR AUTOMATIC SUMMARY GENERATIONS

RELATED APPLICATIONS

This application is a divisional of U.S. patent application Ser. No. 09/660,529, filed Sep. 13, 2000 now U.S. Pat. No. 7,028,325, entitled "Annotating Programs for Automatic Summary Generation," which application claims the benefit of U.S. Provisional Application No. 60/153,730, filed Sep. 13, 1999, entitled "MPEG-7 Enhanced Multimedia Access" which are hereby incorporated by reference in their entireties.

TECHNICAL FIELD

This invention relates to audio/video programming and rendering thereof, and more particularly to annotating programs for automatic summary generation.

BACKGROUND OF THE INVENTION

Watching television has become a common activity for many people, allowing people to receive important information (e.g., news broadcasts, weather forecasts, etc.) as well as simply be entertained. While the quality of televisions on which programs are rendered has improved, so too have a wide variety of devices been developed and made commercially available that further enhance the television viewing experience. Examples of such devices include Internet appliances that allow viewers to "surf" the Internet while watching a television program, recording devices (either analog or digital) that allow a program to be recorded and viewed at a later time, etc.

Despite these advances and various devices, mechanisms for watching television programs are still limited to two general categories: (1) watching the program "live" as it is broadcast, or (2) recording the program for later viewing. Each of these mechanisms, however, limits viewers to watching their programs in the same manner as they were was broadcast (although possibly time-delayed).

Often times, however, people do not have sufficient time to watch the entirety of a recorded television program. By way of example, a sporting event such as a baseball game may take 2 or 2½ hours, but a viewer may only have ½ hour that he or she can spend watching the recorded game. Currently, the only way for the viewer to watch such a game is for the viewer to randomly select portions of the game to watch (e.g., using fast forward and/or rewind buttons), or alternatively use a "fast forward" option to play the video portion of the recorded game back at a higher speed than that at which it was recorded (although no audio can be heard). Such solutions, however, have significant drawbacks because it is extremely difficult for the viewer to know or identify which portions of the game are the most important for him or her to watch. For example, the baseball game may have only a handful of portions that are exciting, with the rest being uninteresting and not exciting.

The invention described below addresses these disadvantages, providing for annotating of programs for automatic summary generation.

SUMMARY OF THE INVENTION

Annotating programs for automatic summary generation is described herein.

In accordance with one aspect, audio/video programming content is made available to a receiver from a content provider, and meta data is made available to the receiver from a meta data provider. The content provider and meta data provider may be the same or different devices. The meta data corresponds to the programming content, and identifies, for each of multiple portions of the programming content, an indicator of a likelihood that the portion is an exciting portion of the content. The meta data can be used, for example, to allow summaries of the programming content to be generated by selecting the portions having the highest likelihoods of being exciting portions.

According to another aspect, exciting portions of a sporting event are automatically identified based on sports-specific events and sports-generic events. The audio data of the sporting event is analyzed to identify sports-specific events (such as baseball hits if the sporting event is a baseball program) as well as sports-generic events (such as excited speech from an announcer). These sports-specific and sports-generic events are used together to identify the exciting portions of the sporting event.

According to another aspect, exciting segments of a baseball program are automatically identified. Various features are extracted from the audio data of the baseball program and selected features are input to an excited speech classification subsystem and a baseball hit detection subsystem. The excited speech classification subsystem identifies probabilities that segments of the audio data contain excited speech (e.g., from an announcer). The baseball hit detection subsystem identifies probabilities that multiple-frame groupings of the audio data include baseball hits. These two sets of probabilities are input to a probabilistic fusion subsystem that determines, based on both probabilities, a likelihood that each of the segments is an exciting portion of the baseball program. These probabilities can then be used, for example, to generate a summary of the baseball program.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

General System

Figure 1:
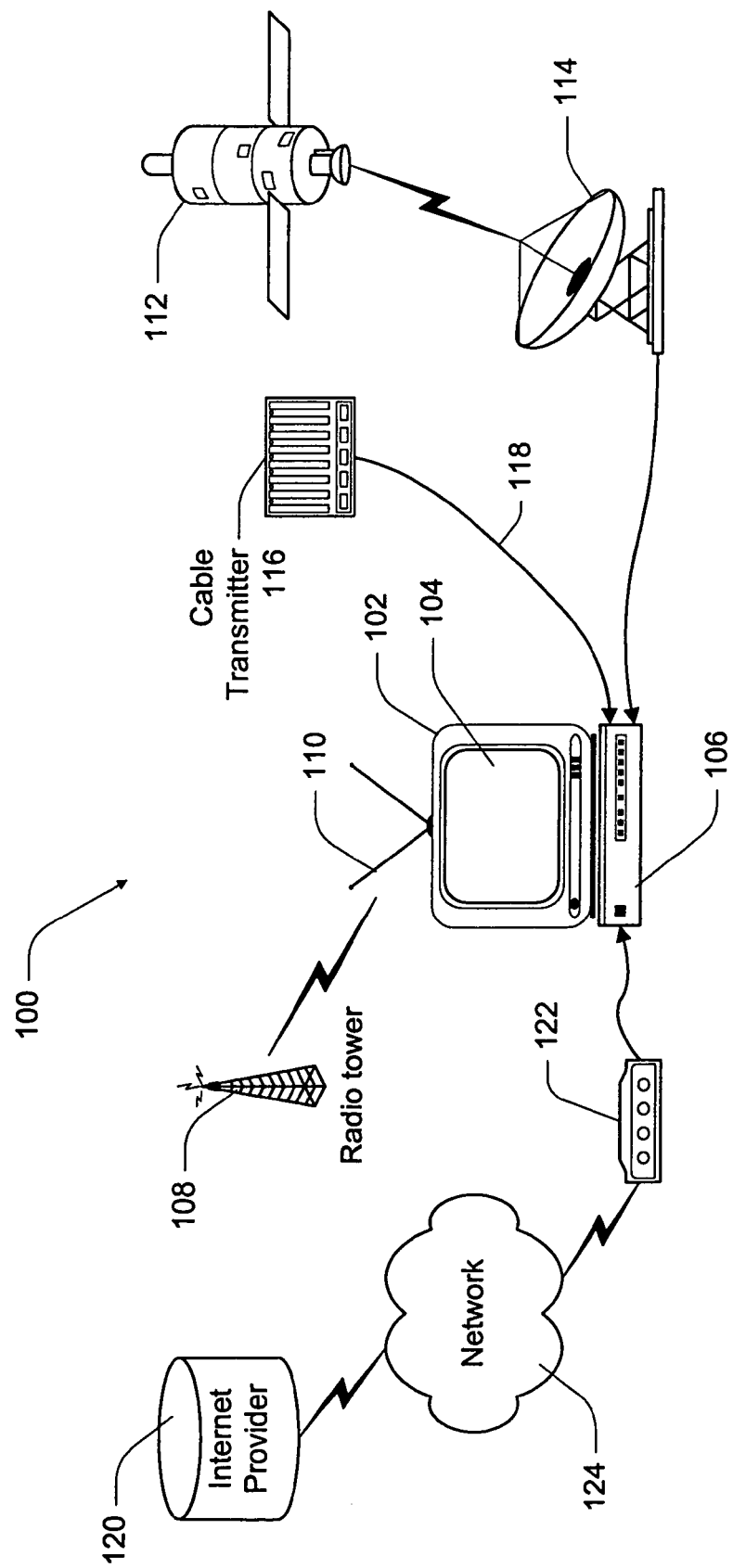
FIG. 1 shows a programming distribution and viewing system in accordance with one embodiment of the invention.

FIG. 1 shows a programming distribution and viewing system 100 in accordance with one embodiment of the invention. System 100 includes a video and audio rendering system 102 having a display device including a viewing area 104.

Video and audio rendering system 102 represents any of a wide variety of devices for playing video and audio content, such as a traditional television receiver, a personal computer, etc. Receiver 106 is connected to receive and render content from multiple different programming sources. Although illustrated as separate components, rendering system 102 may be combined with receiver 106 into a single component (e.g., a personal computer or television). Receiver 106 may also be capable of storing content locally, in either analog or digital format (e.g., on magnetic tapes, a hard disk drive, optical disks, etc.).

While audio and video have traditionally been transmitted using analog formats over the airwaves, current and proposed technology allows multimedia content transmission over a wider range of network types, including digital formats over the airwaves, different types of cable and satellite systems (employing both analog and digital transmission formats), wired or wireless networks such as the Internet, etc.

FIG. 1 shows several different physical sources of programming, including a terrestrial television broadcasting system 108 which can broadcast analog or digital signals that are received by antenna 110; a satellite broadcasting system 112 which can transmit analog or digital signals that are received by satellite dish 114; a cable signal transmitter 116 which can transmit analog or digital signals that are received via cable 118; and an Internet provider 120 which can transmit digital signals that are received by modem 122 via the Internet (and/or other network) 124. Both analog and digital signals can include programming made up of audio, video, and/or other data. Additionally, a program may have different components received from different programming sources, such as audio and video data from cable transmitter 116 but data from Internet provider 120. Other programming sources might be used in different situations, including interactive television systems.

As described in more detail below, programming content made available to system 102 includes audio and video programs as well as meta data corresponding to the programs. The meta data is used to identify portions of the program that are believed to be exciting portions, as well as how exciting these portions are believed to be relative to one another. The meta data can be used to generate summaries for the programs, allowing the user to view only the portions of the program that are determined to be the most exciting.

Exemplary Operating Environment

Figure 2:
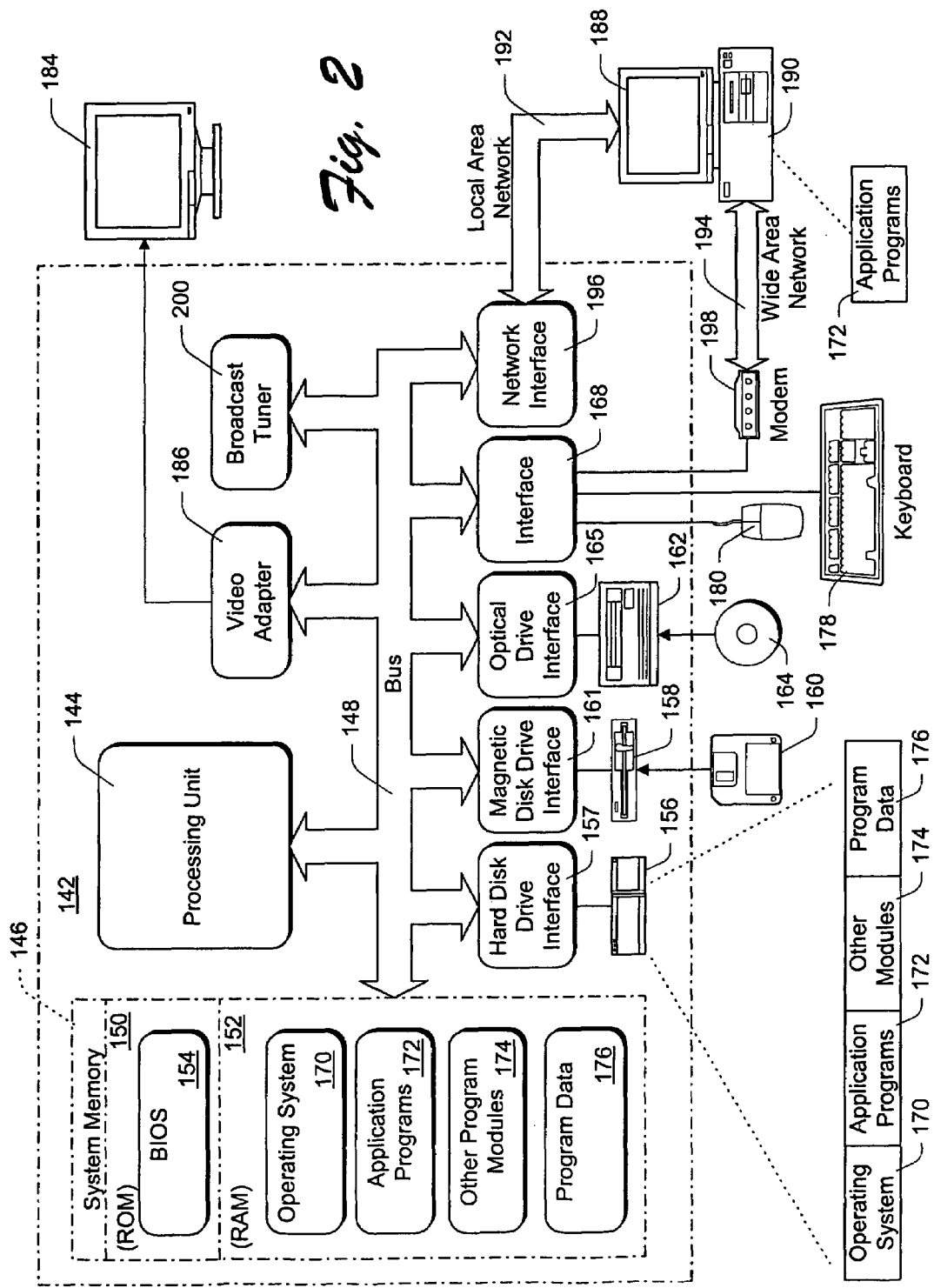
FIG. 2 illustrates an example of a suitable operating environment in which the invention may be implemented.

FIG. 2 illustrates an example of a suitable operating environment in which the invention may be implemented. The illustrated operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics (e.g., digital video recorders), gaming consoles, cellular telephones, network PCs, minicomputers, mainframe computers, distributed computing environments that include any of the above systems or devices, and the like.

Alternatively, the invention may be implemented in hardware or a combination of hardware, software, and/or firmware. For example, one or more application specific integrated circuits (ASICs) could be designed or programmed to carry out the invention.

FIG. 2 shows a general example of a computer 142 that can be used in accordance with the invention. Computer 142 is shown as an example of a computer that can perform the functions of receiver 106 of FIG. 1, or of one of the programming sources of FIG. 1 (e.g., Internet provider 120). Computer 142 includes one or more processors or processing units 144, a system memory 146, and a bus 148 that couples various system components including the system memory 146 to processors 144.

The bus 148 represents one or more of any of several types of bus 11 structures, including a memory bus or memory controller, a peripheral bus, an accelerated graphics port, and a processor or local bus using any of a variety of bus architectures. The system memory 146 includes read only memory (ROM) 150 and random access memory (RAM) 152. A basic input/output system (BIOS) 154, containing the basic routines that help to transfer information between elements within computer 142, such as during start-up, is stored in ROM 150. Computer 142 further includes a hard disk drive 156 for reading from and writing to a hard disk, not shown, connected to bus 148 via a hard disk drive interface 157 (e.g., a SCSI, ATA, or other type of interface); a magnetic disk drive 158 for reading from and writing to a removable magnetic disk 160, connected to bus 148 via a magnetic disk drive interface 161; and an optical disk drive 162 for reading from and/or writing to a removable optical disk 164 such as a CD ROM, DVD, or other optical media, connected to bus 148 via an optical drive interface 165. The drives and their associated computer-readable media provide nonvolatile storage of computer readable instructions, data structures, program modules and other data for computer 142. Although the exemplary environment described herein employs a hard disk, a removable magnetic disk 160 and a removable optical disk 164, it will be appreciated by those skilled in the art that other types of computer readable media which can store data that is accessible by a computer, such as magnetic cassettes, flash memory cards, random access memories (RAMs), read only memories (ROM), and the like, may also be used in the exemplary operating environment.

A number of program modules may be stored on the hard disk, magnetic disk 160, optical disk 164, ROM 150, or RAM 152, including an operating system 170, one or more application programs 172, other program modules 174, and program data 176. A user may enter commands and information into computer 142 through input devices such as keyboard 178 and pointing device 180. Other input devices (not shown) may include a microphone, joystick, game pad, satellite dish, scanner, or the like. These and other input devices are connected to the processing unit 144 through an interface 168 that is coupled to the system bus (e.g., a serial port interface, a parallel port interface, a universal serial bus (USB) interface, etc.). A monitor 184 or other type of display device is also connected to the system bus 148 via an interface, such as a video adapter 186. In addition to the monitor, personal computers typically include other peripheral output devices (not shown) such as speakers and printers.

Computer 142 operates in a networked environment using logical connections to one or more remote computers, such as a remote computer 188. The remote computer 188 may be another personal computer, a server, a router, a network PC, a peer device or other common network node, and typically includes many or all of the elements described above relative to computer 142, although only a memory storage device 190 has been illustrated in FIG. 2. The logical connections depicted in FIG. 2 include a local area network (LAN) 192 and a wide area network (WAN) 194. Such networking environments are commonplace in offices, enterprise-wide computer networks, intranets, and the Internet. In certain embodiments of the invention, computer 142 executes an Internet Web browser program (which may optionally be integrated into the operating system 170) such as the "Internet Explorer" Web browser manufactured and distributed by Microsoft Corporation of Redmond, Wash.

When used in a LAN networking environment, computer 142 is connected to the local network 192 through a network interface or adapter 196. When used in a WAN networking environment, computer 142 typically includes a modem 198 or other means for establishing communications over the wide area network 194, such as the Internet. The modem 198, which may be internal or external, is connected to the system bus 148 via a serial port interface 168. In a networked environment, program modules depicted relative to the personal computer 142, or portions thereof, may be stored in the remote memory storage device. It will be appreciated that the network connections shown are exemplary and other means of establishing a communications link between the computers may be used.

Computer 142 also includes a broadcast tuner 200. Broadcast tuner 200 receives broadcast signals either directly (e.g., analog or digital cable transmissions fed directly into tuner 200) or via a reception device (e.g., via antenna 110 or satellite dish 114 of FIG. 1).

Computer 142 typically includes at least some form of computer readable media. Computer readable media can be any available media that can be accessed by computer 142. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computer 142. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

The invention has been described in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) of the computer.

Content Delivery Architecture

Figure 3:
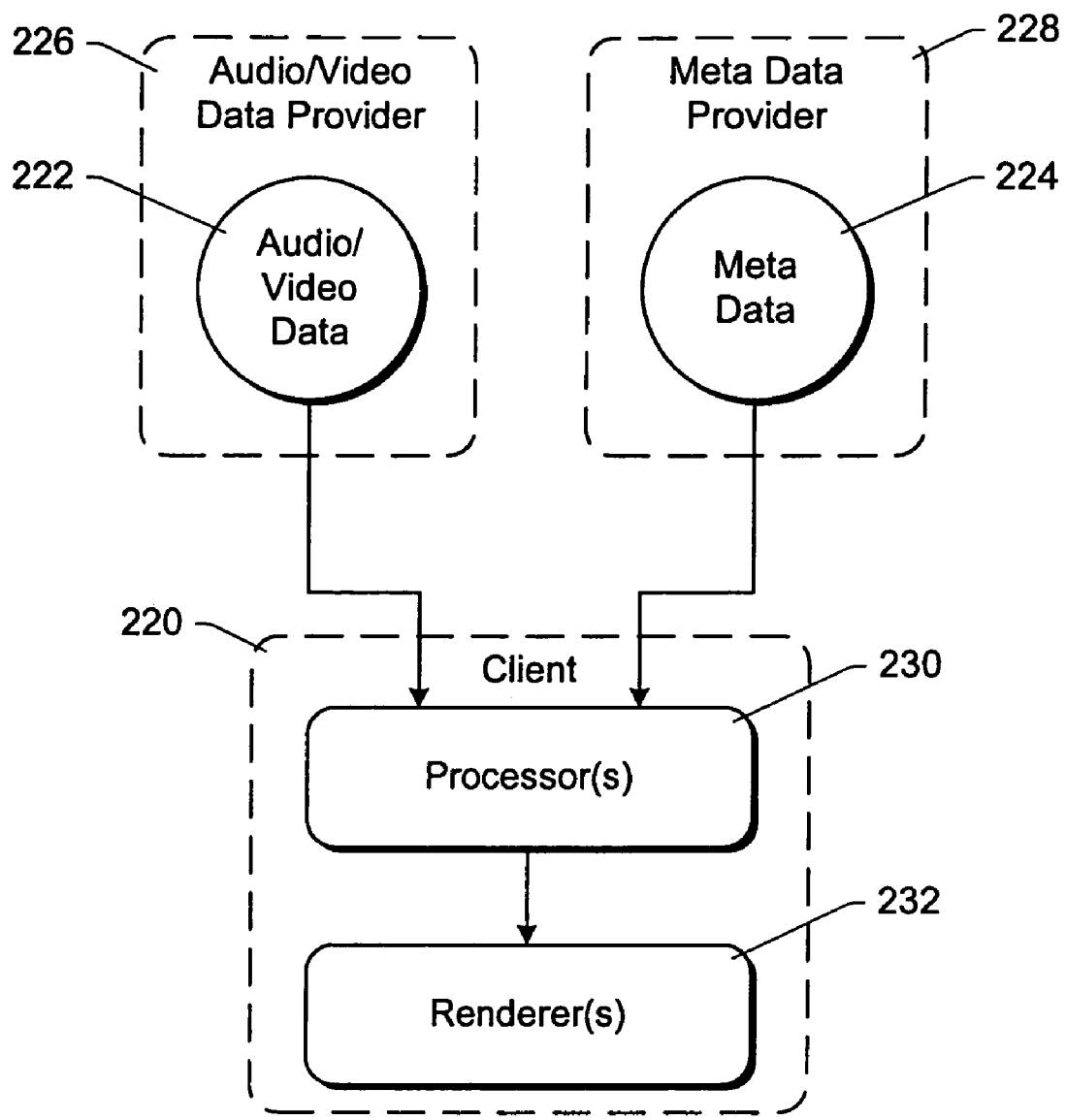
FIG. 3 illustrates an exemplary programming content delivery architecture in accordance with certain embodiments of the invention.

FIG. 3 illustrates an exemplary programming content delivery architecture in accordance with certain embodiments of the invention. A client 220 receives programming content including both audio/video data 222 and meta data 224 that corresponds to the audio/video data 222. In the illustrated example, an audio/video data provider 226 is the source of audio/video data 222 and a meta data provider 228 is the source of meta data 224. Alternatively, meta data 224 and audio/video data 222 may be provided by the same source, or alternatively three or more different sources.

The data 222 and 224 can be made available by providers 226 and 228 in any of a wide variety of formats. In one implementation, data 222 and 224 are formatted in accordance with the MPEG-7 (Moving Pictures Expert Group) format. The MPEG-7 format standardizes a set of Descriptors (Ds) that can be used to describe various types of multimedia content, as well as a set of Description Schemes (DSs) to specify the structure of the Ds and their relationship. In MPEG-7, the audio and video data 222 are each described as one or more Descriptors, and the meta data 224 is described as a Description Scheme.

Client 220 includes one or more processor(s) 230 and renderer(s) 232. Processor 230 receives audio/video data 222 and meta data 224 and performs any necessary processing on the data prior to providing the data to renderer(s) 232. Each renderer 232 renders the data it receives in a human-perceptive manner (e.g., playing audio data, displaying video data, etc.). The processing of data 222 and 224 can vary, and can include, for example, separating the data for delivery to different renderers (e.g., audio data to a speaker and video data to a display device), determining which portions of the program are most exciting based on the meta data (e.g., probabilities included as the meta data), selecting the most exciting segments based on a user-desired summary presentation time (e.g., the user wants a 20-minute summary), etc.

Client 220 is illustrated as separate from providers 226 and 228. This separation can be small (e.g., across a LAN) or large (e.g., a remote server located in another city or state). Alternatively, data 222 and/or 224 may be stored locally by client 220, either on another device such as an analog or digital video recorder (not shown) coupled to client 220 or within client 220 (e.g., on a hard disk drive).

A wide variety of meta data 224 can be associated with a program. In the discussions below, meta data 224 is described as being "excited segment probabilities" which identify particular segments of the program and a corresponding probability or likelihood that each segment is an "exciting" segment. An exciting segment is a segment of the program believed to be typically considered exciting to viewers. By way of example, baseball hits are believed to be typically considered exciting segments of a baseball program.

The excited segment probabilities in meta data 224 can be generated in any of a variety of manners. In one implementation, the excited segment probabilities are generated manually (e.g., by a producer or other individual(s) watching the program and identifying the exciting segments and assigning the corresponding probabilities). In another implementation, the excited segment probabilities are generated automatically by a process described in more detail below. Additionally, the excited segment probabilities can be generated after the fact (e.g., after a baseball game is over and its entirety is available on a recording medium), or alternatively on the fly (e.g., a baseball game may be monitored and probabilities generated as the game is played).

Automatic Summary Generation

The automatic summary generation process described below refers to sports-generic and sports-specific events, and refers specifically to the example of a baseball program. Alternatively, summaries can be automatically generated in an analogous manner for other programs, including other sporting events.

The automatic summary generation process analyzes the audio data of the baseball program and attempts to identify segments that include speech, and of those segments which can be identified as being "excited" speech (e.g., the excitement in an announcer's voice). Additionally, based on the audio data segments that include baseball hits are also identified. These excited speech segments and baseball hit segments are then used to determine, for each of the excited speech segments, a probability that the segment is truly an exciting segment of the program. Given these probabilities, a summary of the program can be generated.

Figure 4:
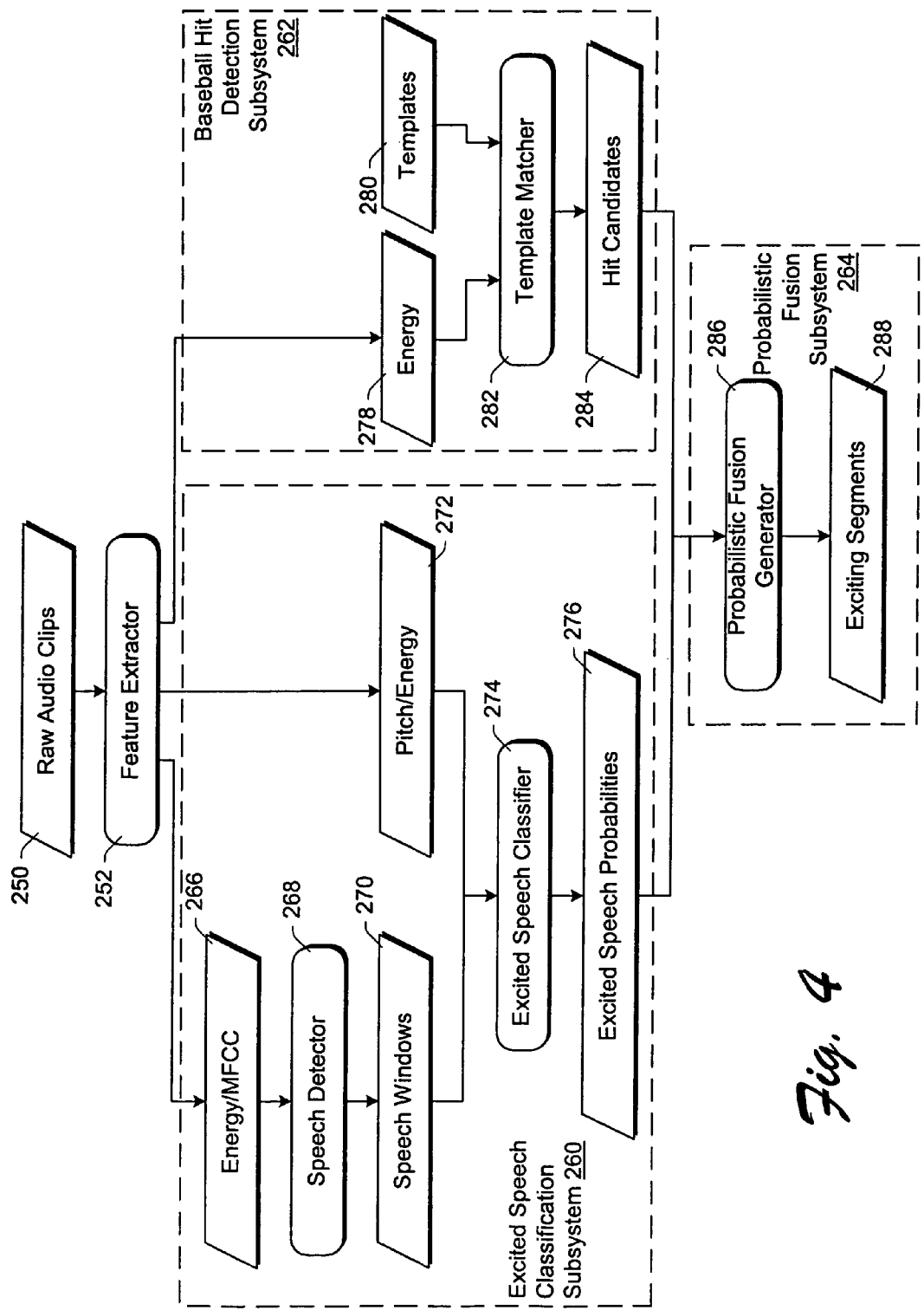
FIG. 4 illustrates an exemplary automatic summary generation process in accordance with certain embodiments of the invention.

FIG. 4 illustrates an exemplary automatic summary generation process in accordance with certain embodiments of the invention. The generation process begins with the raw audio data 250 (also referred to as a raw audio clip), such as the audio portion of data 222 of FIG. 3. The raw audio data 250 is the audio portion of the program for which the summary is being automatically generated. The audio data 250 is input to feature extractor 252 which extracts various features from portions of audio data 250. In one implementation, feature extractor 252 extracts one or more of energy features, phoneme-level features, information complexity features, and prosodic features.

Figure 5:
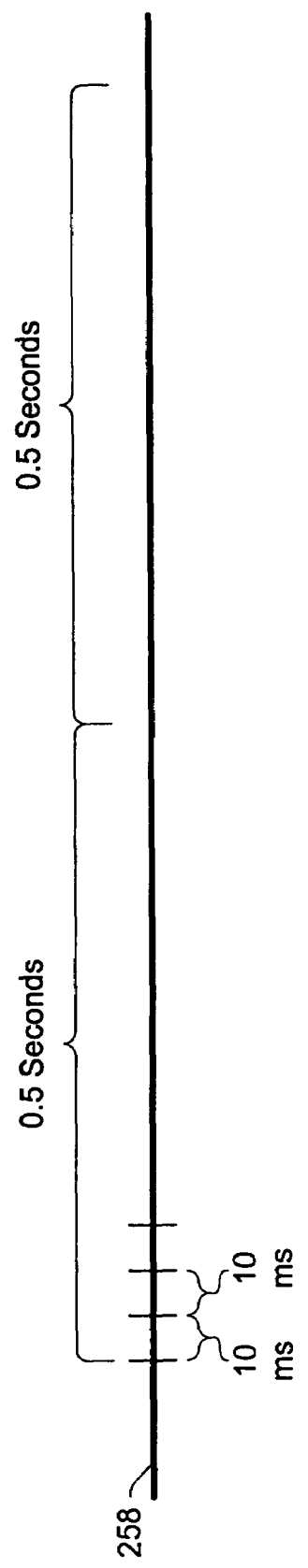
FIG. 5 illustrates part of an exemplary audio clip and portions from which features are extracted.

FIG. 5 illustrates part of an exemplary audio clip and portions from which features are extracted. Audio clip 258 is illustrated. Audio features are extracted from audio clip 258 using two different resolutions: a sports-specific event detection resolution used to assist in the identification of potentially exciting sports-specific events, and a sports-generic event detection resolution used to assist in the identification of potentially exciting sports-generic events. In the illustrated example, the sports-specific event detection resolution is 10 milliseconds (ms), while the sports-generic event detection resolution is 0.5 seconds. Alternatively, other resolutions could be used.

As used herein, the sports-specific event detection is based on 10 ms "frames", while the sports-generic event detection is based on 0.5 second "windows". As illustrated in FIG. 5, the 10 ms frames are non-overlapping and the 0.5 second windows are non-overlapping, although the frames overlap the windows (and vice versa). Alternatively, the frames may overlap other frames, and/or the windows may overlap other windows.

Returning to FIG. 4, feature extractor 252 extracts different features from audio data 250 based on both frames and windows of audio data 250. Exemplary features which can be extracted by feature extractor 252 are discussed below. Different embodiments can use different combinations of these features, or alternatively use only selected ones of the features or additional features.

Extractor 252 extracts energy features for each of the 10 ms frames of audio data 250, as well as for each of the 0.5 second windows. For each frame or window, feature vectors having, for example, one element are extracted that identify the short-time energy in each of multiple different frequency bands. The short-time energy for each frequency band is the average waveform amplitude in the frequency band over the given time period (e.g., 10 ms frame or 0.5 second window). In one implementation, four different frequency bands are used: 0 hz-630 hz, 630 hz-1720 hz, 1720 hz-4400 hz, and 4400 hz and above, referred to as $E_1$, $E_2$, $E_3$, and $E_4$, respectively. An additional feature vector is also calculated as the summation of $E_2$ and $E_3$, referred to as $E_{23}$.

The energy features extracted for each of the 10 ms frames are also used to determine energy statistics regarding each of the 0.5 second windows. Exemplary energy statistics extracted for each frequency band $E_1$, $E_2$, $E_3$, $E_4$, and $E_{23}$ for the 0.5 second window are illustrated in Table I.

TABLE I

| Statistic | Description |
| --- | --- |
| maximum energy | The highest energy value of the frames in the window. |
| average energy | The average energy value of the frames in the window. |
| energy dynamic range | The energy range over the frames in the window (the difference between the maximum energy value and a minimum energy value). |

Extractor 252 extracts phoneme-level features for each of the 10 ms frames of audio data 250. For each frame, two well-known feature vectors are extracted: a Mel-frequency Cepstral coefficient (MFCC) and the first derivative of the MFCC (referred to as the delta MFCC). The MFCC is the cosine transform of the pitch of the frame on the "Mel-scale", which is a gradually warped linear spectrum (with coarser resolution at high frequencies).

Extractor 252 extracts information complexity features for each of the 10 ms frames of audio data 250. For each frame, a feature vector representing the entropy (Etr) of the frame is extracted. For an N-point Fast Fourier Transform (FFT) of an audio signal s(t), with S(n) representing the nth frequency's component, entropy is defined as:

$$Etr = \sum_{n=1}^{N} P_n \log P_n$$

where:

$$P_n = \frac{|S(n)|^2}{\sum_{n=1}^{N} |S(n)|^2}$$

Extracting feature vectors representing entropy is well-known to those skilled in the art and thus will not be discussed further except as it relates to the present invention.

Extractor 252 extracts prosodic features for each of the 0.5 second windows of audio data 250. For each window, a feature vector representing the pitch (Pch) of the window is extracted. A variety of different well-known approaches can be used in determining pitch, such as the auto-regressive model, the average magnitude difference function, the maximum aposteriori (MAP) approach, etc.

The pitch is also determined for each 10 ms frame of the 0.5 second window. These individual frame pitches are then used to extract pitch statistics regarding the pitch of the window. Exemplary pitch statistics extracted for each 0.5 second window are illustrated in Table II.

TABLE II

| Statistic | Description |
| --- | --- |
| non-zero pitch count | The number of frames in the window that have a non-zero pitch value. |
| maximum pitch | The highest pitch value of the frames in the window. |
| minimum pitch | The lowest pitch value of the frames in the window. |
| average pitch | The average pitch value of the frames in the window. |
| pitch dynamic range | The pitch range over the frames in the window (the difference between the maximum and minimum pitch values). |

Selected ones of the extracted features are passed by feature extractor 252 to an excited speech classification subsystem 260 and a baseball hit detection subsystem 262. Excited speech classification subsystem 260 attempts to identify segments of the audio data that include excited speech (sports-generic events), while baseball hit detection subsystem 262 attempts to identify segments of the audio data that include baseball hits (sports-specific events). The segments identified by subsystems 260 and 262 may be of the same or alternatively different sizes (and may be varying sizes). Probabilities generated for the segments are then input to a probabilistic fusion subsystem 264 to determine a probability that the segments are exciting.

Excited speech classification subsystem 260 uses a two-stage process to identify segments of excited speech. In a first stage, energy and phoneme-level features 266 from feature extractor 252 are input to a speech detector 268 that identifies windows of the audio data that include speech (speech windows 270). In the illustrated example, speech detector 268 uses both the $E_{23}$ and the delta MFCC feature vectors. For each 0.5 second window, if the $E_{23}$ and delta MFCC vectors each exceed corresponding thresholds, the window is identified as a speech window 270; otherwise, the window is classified as not including speech. In one implementation, the thresholds used by speech detector 268 are 2.0 for the delta MFCC feature, and 0.07*Ecap for the $E_{23}$ feature (where Ecap is the highest $E_{23}$ value of all the frames in the audio clip (or alternatively all of the frames in the audio clip that have been analyzed so far), although different thresholds could alternatively be used.

In alternative embodiments, speech detector 268 may use different features to classify segments as speech or not speech. By way of example, energy only may be used (e.g., the window is classified as speech only if $E_{23}$ exceeds a threshold amount (such as 0.2*Ecap). By way of another example, energy and entropy features may both be used (e.g., the window is classified as speech only if the product of $E_{23}$ and Etr exceeds a threshold amount (such as 50,000).

In the second stage, pitch and energy features 272, received from feature extractor 252, for each of the speech windows 270 are used by excited speech classifier 274 to determine a probability that each speech window 270 is excited speech. Classifier 274 then combines these probabilities to identify a probability that a group of these windows (referred to as a segment, which in one implementation is five seconds) is excited speech. Classifier 274 outputs an indication of these excited speech segments 276, along with their corresponding probabilities, to probabilistic fusion subsystem 264.

Excited speech classifier 274 uses six statistics regarding the energy $E_{23}$ features and the pitch (Pch) features extracted from each speech window 270: maximum energy, average energy, energy dynamic range, maximum pitch, average pitch, and pitch dynamic range. Classifier 274 concatenates these six statistics together to generate a feature vector (having nine elements or dimensions) and compares the feature vector to a set of training vectors (based on corresponding features of training sample data) in two different classes: an excited speech class and a non-excited speech class. The posterior probability of a feature vector X (for a window 270) being in a class $C_i$, where $C_1$ is the class of excited speech and $C_2$ is the class of non-excited speech, can be represented as: $P(C_i|X)$. The probability of error in classifying the feature vector X can be reduced by classifying the data to the class having the posterior probability that is the highest.

Speech classifier 274 determines the posterior probability $P(C_i|X)$ using learning machines. A wide variety of different learning machines can be used to determine the posterior probability $P(C_i|X)$. Three such learning machines are described below, although other learning machines could alternatively be used.

The posterior probability $P(C_i|X)$ can be determined using parametric machines, such as Bayes rule:

$$P(C_i | X) = \frac{P(C_i)p(X | C_i)}{p(X)}$$

where p(X) is the data density, $P(C_i)$ is the prior probability, and $p(X|C_i)$ is the conditional class density. The data density p(x) is a constant for all the classes and thus does not contribute to the decision rule. The prior probability $P(C_i)$ can be estimated from labeled training data (e.g., excited speech and non-excited speech) in a conventional manner. The conditional class density $p(X|C_i)$ can be calculated in a variety of different manners, such as the Gaussian (Normal) distribution $N(\mu,\sigma)$. The $\mu$ parameter (mean) and the $\sigma$ parameter (standard deviation) can be determined using the well-known Maximum Likelihood Estimation (MLE):

$$\mu = \frac{1}{n}\sum_{k=1}^{n} X_k$$

$$\sigma^2 = \frac{1}{n}\sum_{k=1}^{n} (X_k - \mu)$$

where n is the number of training samples and X represents the training samples.

Another type of machines that can be used to determine the posterior probability $P(C_i|X)$ are non-parametric machines. The K nearest neighbor technique is an example of such a machine. Using the K nearest neighbor technique:

$$P(C_i | X) = \frac{\frac{Ki}{nV}}{\sum_i \frac{K_i}{nV}} = \frac{K_i}{K}$$

where V is the volume around feature vector X, V covers K labeled (training) samples, and $K_i$ is the number of samples in class $C_i$.

Another type of machines that can be used to determine the posterior probability $P(C_i|X)$ are semi-parametric machines, which combine the advantages of non-parametric and parametric machines. Examples of such semi-parametric machines include Gaussian mixture models, neural networks, and support vector machines (SVMs).

Any of a wide variety of well-known training methods can be used to train the SVM. After the SVM is trained, a sigmoid function is trained to map the SVM outputs into posterior probabilities. The posterior probability $P(C_i|X)$ can then be determined as follows:

$$P(C_i \mid X) = \frac{1}{1 + \exp(AX + B)}$$

where A and B are the parameters of the sigmoid function. The parameters A and B are determined by reducing the negative log likelihood of training data $(f_i, t_i)$, which is a cross-entropy error function:

$$\min - \sum_i t_i \log(p_i) + (1 - t_i)\log(1 - p_i)$$

where $$p_i = \frac{1}{1 + \exp(Af_i + B)}$$

The cross-entropy error function minimization can be performed using any number of conventional optimization processes. The training data $(f_i, t_i)$ can be the same training data used to train the SVM, or other data sets. For example, the training data $(f_i, t_i)$ can be a hold out set (in which a fraction of the initial training set, such as 30%, is not used to train the SVM but is used to train the sigmoid) or can be generated using three-fold cross-validation (in which the initial training set is split into three parts, each of three SVMs is trained on permutations of two out of three parts, and the $f_i$ are evaluated on the remaining third, and the union of all three sets $f_i$ forming the training set of the sigmoid).

Additionally, an out-of-sample model is used to avoid "overfitting" the sigmoid. Out-of-sample data is modeled with the same empirical density as the sigmoid training data, but with a finite probability of opposite label. In other words, when a positive example is observed at a value $f_i$, rather than using $t_i=1$, it is assumed that there is a finite chance of opposite label at the same $f_i$ in the out-of-sample data. Therefore, a value of $t_i=1-\epsilon_+$ is used, for some $\epsilon_+$. Similarly, a negative example will use a target value of $t_i=\epsilon_-$.

Regardless of the manner in which the posterior probability $P(C_i|X)$ for a 0.5 second window is determined, the posterior probabilities for multiple windows are combined to determine the posterior probability for a segment. In one implementation, each segment is five seconds, so the posterior probabilities of ten adjacent windows are used to determine the posterior probability for each segment.

The posterior probabilities for the multiple windows can be combined in a variety of different manners. In one implementation, the posterior probability of the segment being an exciting segment, referred to as P(ES), is determined by averaging the posterior probabilities of the windows in the segment:

$$P(ES) = \frac{1}{M} \sum_{m=1}^{M} P(C_1 \mid X_m)$$

where $C_1$ represents the excited speech class and M is the number of windows in the segment.

Which ten adjacent windows to use for a segment can be determined in a wide variety of different manners. In one implementation, if ten or more adjacent windows include speech, then those adjacent windows are combined into a single segment (e.g., which may be greater than ten windows, or, if too large, which may be pared down into multiple smaller ten-window segments). However, if there are fewer than ten adjacent windows, then additional windows are added (before and/or after the adjacent windows, between multiple groups of adjacent windows, etc.) to get the full ten windows, with the posterior probability for each of these additional windows being zero.

The probabilities P(ES) of these segments including excited speech 276 (as well as an indication of where these segments occur in the raw audio clip 250) are then made available to probabilistic fusion subsystem 264. Subsystem 264 combines the probabilities 276 with information received from baseball hit detection subsystem 262, as discussed in more detail below.

Baseball hit detection subsystem 262 uses energy features 278 from feature extractor 252 to identify baseball hits within the audio data 250. In one implementation, the energy features 278 include the $E_{23}$ and $E_4$ features discussed above. Two additional features are also generated, which may be generated by feature extractor 252 or alternatively another component (not shown). These additional features are referred to as $ER_{23}$ and $ER_4$, and are discussed in more detail below.

Hit detection is performed by subsystem 262 based on 25-frame groupings. A sliding selection of 25 consecutive 10 ms frames of the audio data 250 is analyzed, with the frame selection sliding frame-by-frame through the audio data 250. The features of the 25-frame groupings and a set of hit templates 280 are input to template matcher 282. Template matcher 282 compares the features of each 25-frame grouping to the hit templates 280, and based on this comparison determines a probability as to whether the particular 25-frame grouping contains a hit. An identification of the 25-frame groupings (e.g., the first frame in the grouping) and their corresponding probabilities are output by template matcher 282 as hit candidates 284.

Multiple-frame groupings are used to identify hits because the sound of a baseball hit is typically longer in duration than a single frame (which is, for example, only 10 ms). The baseball hit templates 280 are established to capture the shape of the energy curves (using the four energy features discussed above) over the time of the groupings (e.g., 25 10 ms frames, or 0.25 seconds). Baseball hit templates 280 are designed so that the hit peak (the energy peak) is at the $8^{th}$ frame of the 25-frame grouping. The additional features $ER_{23}$ and $ER_4$ are calculated by normalizing the $E_{23}$ and $E_4$ features based on the energy features in the $8^{th}$ frame as follows:

$$ER_{23}(i) = \frac{E_{23}(i)}{E_{23}(8)}$$

$$ER_4(i) = \frac{E_4(i)}{E_4(8)}$$

where i ranges from 1 to 25, $E_{23}(8)$ is the $E_{23}$ energy in the $8^{th}$ frame, and $E_4(8)$ is the $E_4$ energy in the $8^{th}$ frame.

Figure 6:
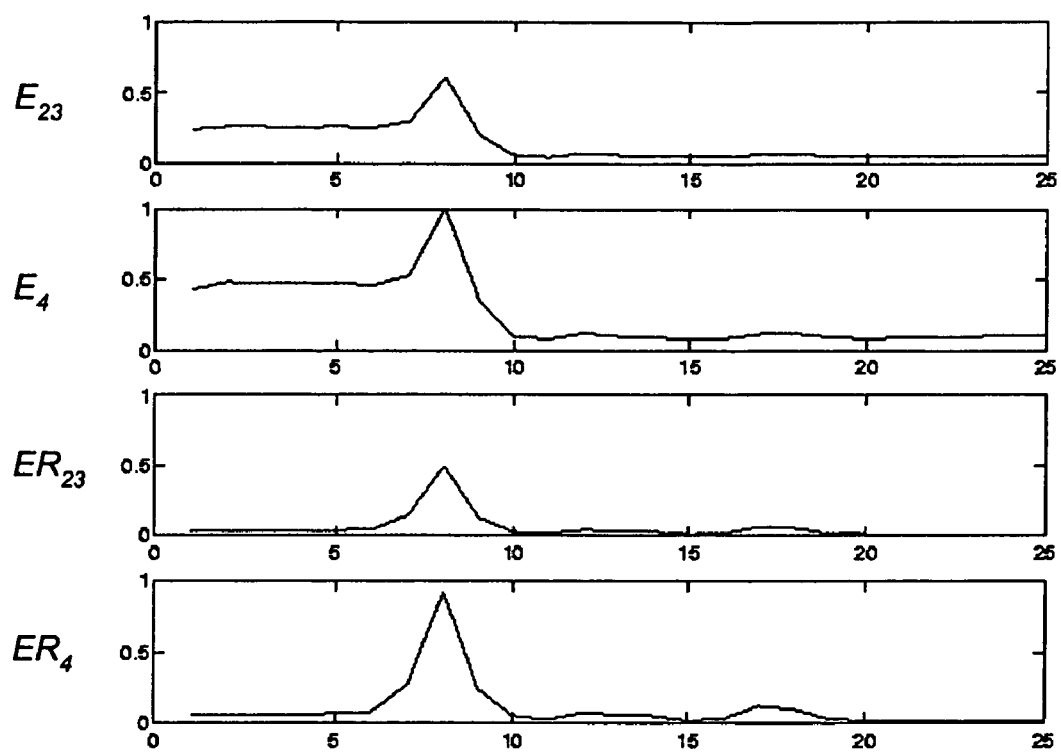
FIG. 6 illustrates exemplary baseball hit templates that may be used in accordance with certain embodiments of the invention.

FIG. 6 illustrates exemplary baseball hit templates 280 that may be used in accordance with certain embodiments of the invention. The templates 280 in FIG. 6 illustrate the shape of the energy curves over time (25 frames) for each of the four features $E_{23}$, $E_4$, $ER_{23}$, and $ER_4$.

For each group of frames, template matcher 282 determines the probability that the group contains a baseball hit. This can be accomplished in multiple different manners, such as un-directional or directional template mapping. Initially, the four feature vectors for each of the 25 frames are concatenated, resulting in a 100-element vector. The templates 280 are similarly concatenated for each of the 25 frames, also resulting in a 100-element vector. The probability of a baseball hit in a grouping P(HT) can be calculated based on the Mahalanobis distance D between the concatenated feature vector and the concatenated template vector as follows:

$$D^2 = (\vec{X} - \vec{T})^T \Sigma^{-1} (\vec{X} - \vec{T})$$

where $\vec{X}$ is the concatenated feature vector, $\vec{T}$ is the concatenated template vector, and $\Sigma$ is the covariance matrix of $\vec{T}$. Additionally, $\Sigma$ is restricted to being a diagonal matrix, allowing the baseball hit probability P(HT) to be determined as follows:

$$P(HT) = \frac{\exp\left(-\frac{1}{2}D^2\right)}{C + \exp\left(-\frac{1}{2}D^2\right)}$$

where C is a constant that is data dependent (e.g., exp(-0.5D'$^2$), where D'$^2$ is the distance between the concatenated feature vector and a template for non-hit signals).

Alternatively, a directional template matching approach can be used, with the distance D being calculated as follows:

$$D^2 = (\vec{X} - \vec{T})^T I \times \Sigma^{-1} (\vec{X} - \vec{T})$$

where I is a diagonal indicator matrix. The indicator matrix I is adjusted to account for over-mismatches or under-mismatches (an over-mismatch is actually good). In one implementation, when the values of $E_{23}$ for the 25-frame grouping are overmatching the templates (e.g., more than a certain number (such as one-half) of the data values in the 25-frame grouping are higher than the corresponding template values), then I=diag[1, . . . , 1, -1, 1, . . . , 1] where the -1 is at location 8. However, when the values of $E_{23}$ for the 25-frame grouping are under-matching the templates (e.g., less than a certain number (such as one-half) of the data values in the 25-frame grouping are less than the corresponding template values), then I=diag[-1, . . . ,-1,-1,-1, . . . , -1] where the 1 is at location 8.

Although hit detection is described as being performed across all of the audio data 250, alternatively hit detection may be performed on only selected portions of the audio data 250. By way of example, hit detection may only be performed on the portions of audio data 250 that are excited speech segments (or speech windows) and for a period of time (e.g., five seconds) prior to those excited speech segments (or speech windows).

Probabilistic fusion generator 286 of subsystem 264 receives the excited speech segment probabilities P(ES) from excited speech classification subsystem 260 and the baseball hit probabilities P(HT) from baseball hit detection subsystem 262 and combines those probabilities to identify probabilities P(E) that segments of the audio data 250 are exciting. Probabilistic fusion generator 286 searches for hit frames within the 5-second interval of the excited speech segment. This combining is also referred to herein as "fusion".

Two different types of fusion can be used: weighted fusion and conditional fusion. Weighted fusion applies weights to each of the probabilities P(ES) and P(HT) adds the results to obtain the value P(E) as follows:

$$P(E) = W_{ES} P(ES) + W_{HT} P(HT)$$

where the weights $W_{ES}$ and $W_{HT}$ sum up to 1.0. In one implementation, $W_{ES}$ is 0.83 and $W_{HT}$ is 0.17, although other weights could alternatively be used.

Conditional fusion, on the other hand, accounts for the detected baseball hits adjusting the confidence level of the P(ES) estimation (e.g., that the excited speech probability is not high due to mislabeling a car horn as speech). The conditional fusion is calculated as follows:

$$P(E) = P(CF) P(ES)$$

$$P(CF) = P(CF|HT) P(HT) + P(CF|\overline{HT}) P(\overline{HT})$$

$$P(\overline{HT}) = 1 - P(HT)$$

where P(CF) is the probability of how much confidence there is in the P(ES) estimation, and P($\overline{HT}$) is the probability that there is no hit. P(CF|HT) represents the probability that we are confident that P(ES) is accurate given there is a baseball hit. Similarly, P(CF|$\overline{HT}$) represents the probability that we are confident that P(ES) is accurate given there is no baseball hit. Both conditional probabilities P(CF|HT) and P(CF|$\overline{HT}$) can be estimated from the training data. In one implementation, the value of P(CF|HT) is 1.0 and the value of P(CF|$\overline{HT}$) is 0.3.

The final probability P(E) that a segment is an exciting segment is then output by generator 286, identifying the exciting segments 288. These final probabilities, and an indication of the segments they correspond to, are stored as the meta data 224 of FIG. 3.

The actual portions of the program rendered for a user as the summary of the program are based on these exciting segments 288. Various modifications may be made, however, to make the rendering smoother. Examples of such modifications include: starting rendering of the exciting segment a period of time (e.g., three seconds) earlier than the hit (e.g., to render the pitching of the ball); merging together overlapping segments; merging together close-by (e.g., within is ten seconds) segments; etc.

Once the probabilities that segments are exciting are identified, the user can choose to view a summary or highlights of the program. Which segments are to be delivered as the summary can be determined locally (e.g., on the user's client computer) or alternatively remotely (e.g., on a remote server).

Additionally, various "pre-generated" summaries may be generated and maintained by remote servers. For example, a remote server may identify which segments to deliver if a 15-minute summary is requested and which segments to deliver if a 30-minute summary is requested, and then store these identifications. By pre-generating such summaries, if a user requests a 15-minute summary, then the pre-generated indications simply need to be accessed rather than determining, at the time of request, which segments to include in the summary.

Figure 7:
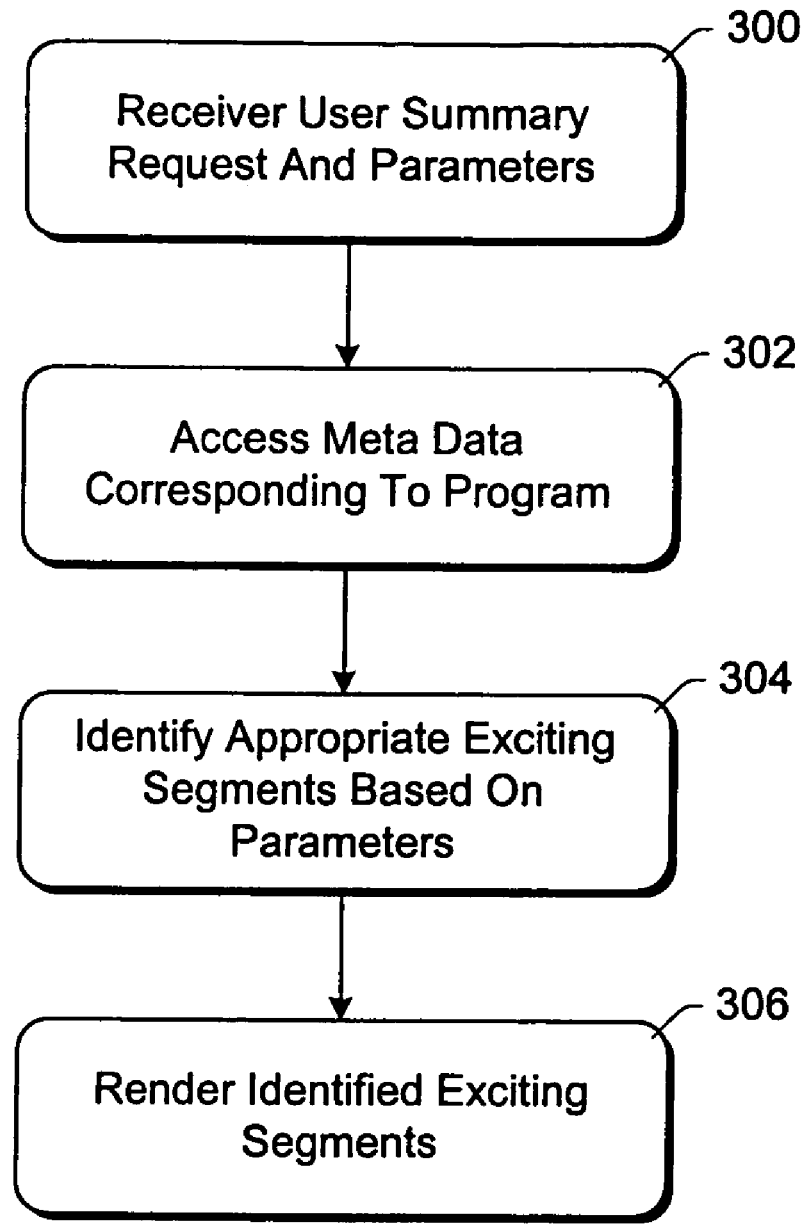
FIG. 7 is a flowchart illustrating an exemplary process for rendering a program summary to a user in accordance with certain embodiments of the invention.

FIG. 7 is a flowchart illustrating an exemplary process for rendering a program summary to a user in accordance with certain embodiments of the invention. The acts of FIG. 7 may be implemented in software, and may be carried out by a receiver 106 of FIG. 1 or alternatively a programming source of FIG. 1 (e.g., Internet provider 120).

Initially, the user request for a summary is received along with parameters for the summary (act 300). The parameters of the summary identify what level of summary the user desires, and can vary by implementation. By way of example, a user may indicate as the summary parameters that he or she wants to be presented with any segments that have a probability of 0.75 or higher of being exciting segments. By way of another example, a user may indicate as the summary parameters that he or she wants to be presented with a 20-minute summary of the program.

The meta data corresponding to the program (the exciting segment probabilities P(E)) is then accessed (act 302), and the appropriate exciting segments identified based on the summary parameters (act 304). Once the appropriate exciting segments are identified, they are rendered to the user (act 306). The manner in which the appropriate exciting segments are identified can vary, in part based on the nature of the summary parameters. If the summary parameters indicate that all segments with a P(E) of 0.75 or higher should be presented, then all segments with a P(E) of 0.75 or greater are identified. If the summary parameters indicate that a 20-minute summary should be generated, then the appropriate segments are identified by determining (based on the P(E) of the segments and the lengths of the segments) the segments having the highest P(E) that have a combined length less than 20 minutes.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. One or more computer readable media having stored thereon a plurality of instructions that, when executed by one or more processors, causes the one or more processors to perform acts including:
   receiving the audio portion of a sporting event;
   classifying a set of segments of the audio portion as excited speech;
   classifying a set of frame groupings as including baseball hits;
   combining the set of segments and the set of frame groupings to identify probabilities for each segment that the segment is an exciting segment; and
   saving an indication of the set of segments and the corresponding probabilities as meta data corresponding to the sporting event.

2. One or more computer readable media as recited in claim 1, wherein the classifying a set of segments as excited speech comprises:
   extracting a first set of features from the audio portion;
   identifying, based on the first set of features, a plurality of windows of the audio portion that include speech;
   extracting a second set of features from the audio portion; and
   identifying, based on the second set of features, which of the plurality of windows include excited speech.

3. One or more computer readable media as recited in claim 2, wherein extracting the first set of features comprises, for each of a plurality of windows:
   identifying an average waveform amplitude of the audio portion in a first frequency band of the window;
   identifying an average waveform amplitude of the audio portion in a second frequency band of the window;
   concatenating the identified average waveform amplitudes to generate an energy feature of the first set of features; and
   determining, for an MFCC feature of the first set of features, the Mel-frequency Cepstral coefficient of the window.

4. One or more computer readable media as recited in claim 2, wherein extracting the second set of features comprises, for each of a plurality of windows:
   identifying, for each of a plurality of frames in the window, an average waveform amplitude of the audio portion in a first frequency band;
   concatenating the identified average waveform amplitudes to generate an energy feature;
   extracting, as a pitch feature of each frame, the pitch of each frame;
   identifying a plurality of statistics regarding each window based on the energy features and pitch features of the plurality of frames.

5. One or more computer readable media as recited in claim 4, wherein the identifying which of the plurality of windows include excited speech comprises identifying a posterior probability that the window corresponds to an excited speech class and identifying a posterior probability that the window corresponds to a non-excited speech class, and classifying the window in the class with the higher posterior probability.

6. One or more computer readable media as recited in claim 2, further comprising instructions that cause the one or more processors to perform acts including outputting an excited speech probability for each of the segments that include excited speech, the excited speech probability for a segment indicating a likelihood that the segment includes excited speech.

7. One or more computer readable media as recited in claim 1, wherein the combining comprises generating, for each of the set of segments, a weighted sum of a probability that the segment includes excited speech and a probability that a frame grouping within the segment includes a baseball hit.

8. A system comprising:
   a feature extractor to extract a plurality of audio features from programming content;
   an excited speech classification subsystem to identify, based on a sub-set of the audio features, a set of segments of the programming content and corresponding probabilities that the segments include excited speech;
   a baseball hit detection subsystem to identify, based on another sub-set of the audio features, a set of frame groupings of the programming content and corresponding probabilities that the frame groupings include baseball hits; and a probabilistic fusion subsystem to combine the probabilities that the segments include excited speech and the probabilities that the frame groupings include baseball hits, and to generate a probability that portions of the programming content are exciting based on the combination.

9. A system as recited in claim 8, wherein the excited speech classification subsystem is to identify the set of segments by:
identifying, based on a first set of the plurality of audio features, a plurality of windows of the programming content that include speech;
identifying, based on a second set of the plurality of audio features, which of the plurality of windows include excited speech.

10. A system as recited in claim 8, wherein the baseball hit detection subsystem is to identify the set of frame groupings by:
combining, for each of a plurality of multiple-frame groupings, a set of features from the programming content;
comparing the sets of features from the multiple-frame groupings to a set of templates; and
identifying, for each of the multiple-frame groupings, a probability that the grouping includes a baseball hit based on how well the grouping matches the set of templates.

11. A method comprising:
analyzing audio data of a program to identify a first plurality of portions of the program each including excited speech;
analyzing the audio data to identify a second plurality of portions of the program each including a potential sport-related event; and
combining the first plurality of portions and the second plurality of portions to identify a set of segments of the program and a likelihood, for each of the segments in the set, that the segment is an exciting part of the program.

12. A method of claim 11 wherein the sport-related event is a baseball hit.

13. A method as recited in claim 11, wherein the analyzing audio data to identify the first plurality of portions comprises:
extracting a first set of features from the audio data;
identifying, based on the first set of features, a plurality of windows of the audio data that include speech;
extracting a second set of features from the audio data; and
identifying, based on the second set of features, which of the plurality of windows include excited speech.

14. A method as recited in claim 13, wherein extracting the second set of features comprises, for each of a plurality of windows:
identifying, for each of a plurality of frames in the window, an average waveform amplitude of the audio data in a first frequency band;
identifying, for each of the plurality of frames in the window, an average waveform amplitude of the audio data in a second frequency band;
concatenating the identified average waveform amplitudes to generate an energy feature;
extracting, as a pitch feature of each frame, the pitch of each frame; and
identifying a plurality of statistics regarding each window based on the energy features and pitch features of the plurality of frames.

15. A method as recited in claim 14, wherein the identifying which of the plurality of windows include excited speech comprises identifying a posterior probability that the window corresponds to an excited speech class and identifying a posterior probability that the window corresponds to a non-excited speech class, and classifying the window in the class with the higher posterior probability.

16. A method as recited in claim 13, further comprising outputting an excited speech probability corresponding to each of a plurality segments that include excited speech, each segment including a plurality of windows, the excited speech probability for a segment indicating a likelihood that the segment includes excited speech.

17. A method as recited in claim 11, wherein the analyzing audio data to identify the second plurality of portions comprises:
extracting, for each frame in a multiple-frame grouping, a set of features from the audio data;
comparing the set of features from the multiple-frame groupings to a set of templates; and
identifying, for each of the multiple-frame groupings, a probability that the grouping includes a sport-related event based on how well the grouping matches the set of templates.

18. A method of claim 17 wherein the sport-related event is a baseball hit.

19. A method as recited in claim 17, wherein the combining comprises adjusting the probability that a portion includes excited speech based on the probability that the portion includes a sport-related event.

20. A method of claim 19 wherein the sport-related event is a baseball hit.

* * * * *